United States Patent
Ju et al.

(10) Patent No.: US 9,981,387 B2
(45) Date of Patent: May 29, 2018

(54) ROBOT CONTROL SYSTEM

(71) Applicant: HANWHA TECHWIN CO., LTD., Changwon-si (KR)

(72) Inventors: Jaehyuk Ju, Changwon-si (KR); Jihyuk Song, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 67 days.

(21) Appl. No.: 14/791,842

(22) Filed: Jul. 6, 2015

(65) Prior Publication Data

US 2016/0008984 A1 Jan. 14, 2016

(30) Foreign Application Priority Data

Jul. 9, 2014 (KR) .......................... 10-2014-0086157

(51) Int. Cl.
| | |
|---|---|
| *H04N 19/30* | (2014.01) |
| *B25J 9/16* | (2006.01) |
| *G06T 3/40* | (2006.01) |

(52) U.S. Cl.
CPC .............. *B25J 9/1697* (2013.01); *G06T 3/40* (2013.01); *H04N 19/30* (2014.11); *Y10S 901/01* (2013.01); *Y10S 901/47* (2013.01)

(58) Field of Classification Search
None
See application file for complete search history.

(56) References Cited

U.S. PATENT DOCUMENTS

| | | | | |
|---|---|---|---|---|
| 6,430,471 | B1 * | 8/2002 | Kintou | H04L 29/06 180/169 |
| 7,382,396 | B2 | 6/2008 | Ryu | |
| 7,756,349 | B2 | 7/2010 | Izawa | |
| 8,594,182 | B1 * | 11/2013 | Pardue | H04N 5/77 375/240.01 |
| 9,056,676 | B1 * | 6/2015 | Wang | B64F 1/00 |
| 2005/0226463 | A1 * | 10/2005 | Suzuki | G08B 13/19656 382/103 |
| 2013/0263201 | A1 * | 10/2013 | Chung-How | H04L 1/0003 725/116 |
| 2014/0094300 | A1 * | 4/2014 | Liu | G07F 17/3225 463/31 |
| 2015/0358537 | A1 * | 12/2015 | Mirza | H04N 5/23229 348/231.99 |

FOREIGN PATENT DOCUMENTS

| | | |
|---|---|---|
| JP | 2000-184469 A | 6/2000 |
| JP | 2005-20731 A | 1/2005 |
| KR | 10-2006-0104933 A | 10/2006 |

* cited by examiner

*Primary Examiner* — Roberto Velez
*Assistant Examiner* — Yih-Sien Kao
(74) *Attorney, Agent, or Firm* — Sughrue Mion, PLLC

(57) ABSTRACT

Provided is a robot control system and a method thereof. The robot control system includes: a mobile robot comprising at least one camera; and a controller, wherein the controller is configured to transmit, to the mobile robot, a signal for adjusting a resolution of a next image to be transmitted from the at least one camera to the controller, based on a data transmission rate of a current image captured by the at least one camera and output to the controller, and wherein the mobile robot is configured to adjust the resolution of the next image, based on the signal for adjusting the resolution of the next image.

9 Claims, 6 Drawing Sheets

| TRANSMISSION RATE (Mbps) | RESOLUTION |
|---|---|
| 8.50 or less | 1920 x 1400 |
| 8.51 ~ 9.00 | 1856 x 1392 |
| 9.01 ~ 9.50 | 1792 x 1344 |
| 9.51 ~ 10.00 | 1600 x 1200 |
| 10.01 ~ 10.50 | 1280 x 1024 |
| 10.51 ~ 11.00 | 1280 x 960 |
| 11.01 ~ 11.50 | 1152 x 864 |
| 11.51 or more | 1024 x 768 |

LOW ↓ HIGH (Transmission Rate)

HIGH ↑ LOW (Resolution)

FIG. 7

| TRANSMISSION RATE (Mbps) | RESOLUTION | | | |
|---|---|---|---|---|
| | FIRST CHANNEL | SECOND CHANNEL | THIRD CHANNEL | FOURTH CHANNEL |
| 8.50 or less | 1920 X 1440 | 1856 X 1392 | 1792 X 1344 | 1600 X 1200 |
| 8.51 ~ 9.00 | 1856 X 1392 | 1792 X 1344 | 1600 X 1200 | 1280 X 1024 |
| 9.01 ~ 9.50 | 1792 X 1344 | 1600 X 1200 | 1280 X 1024 | 1280 X 960 |
| 9.51 ~ 10.00 | 1600 X 1200 | 1280 X 1024 | 1280 X 960 | 1152 X 864 |
| 10.01 ~ 10.50 | 1280 X 1024 | 1280 X 960 | 1152 X 864 | 1024 X 768 |
| 10.51 ~ 11.00 | 1280 X 960 | 1152 X 864 | 1024 X 768 | 800 X 600 |
| 11.01 ~ 11.50 | 1152 X 864 | 1024 X 768 | 800 X 600 | 640 X 480 |
| 11.51 or more | 1024 X 768 | 800 X 600 | 640 X 480 | 640 X 400 |

TRANSMISSION RATE LOW ↓ TRANSMISSION RATE HIGH

RESOLUTION HIGH ↑ RESOLUTION LOW

RESOLUTION HIGH ← RESOLUTION LOW

ROBOT CONTROL SYSTEM

CROSS-REFERENCE TO THE RELATED APPLICATION

This application claims priority from Korean Patent Application No. 10-2014-0086157, filed on Jul. 9, 2014, in the Korean Intellectual Property Office, the disclosure of which is incorporated herein in its entirety by reference.

BACKGROUND

1. Field

Apparatuses and methods consistent with exemplary embodiments relate to a robot control system, and more particularly, to a robot control system that transmits live-view moving picture data from a mobile robot to a control device of a remote control center, and outputs the real-time moving picture data to a display device through the control device.

2. Description of the Related Art

A typical robot control system includes a mobile robot and a control device that is included in a remote control center.

The mobile robot transmits live-view moving picture data to the controller of the remote control center through wireless communication therewith.

The control device outputs the live-view moving picture data to a display device through wireless communication with the mobile robot. In addition, according to a drive signal output from a user input device, the controller transmits a remote control signal to the mobile robot.

In detail, the mobile robot has two modes of operation; one is an automatic operation mode, and the other is a remote control operation mode.

In the case of the remote control operation mode, the mobile robot is remotely controlled by a user input in the remote control center. Here, cameras for capturing images of surroundings thereof are attached to the mobile robot such that a controller of the mobile robot transmits live-view moving picture data obtained by the cameras to the controller of the remote control center. Accordingly, the controller of the remote control center a display device to display the live-view moving pictures representing the surroundings of the mobile robot. Meanwhile, a user manipulates the user input module while watching the moving pictures representing the surroundings of the mobile robot. The controller of the remote control center generates a remote control signal in response to the drive signal output from the user input device, and such a remote control signal is transmitted to the mobile robot through an antenna of the remote control center. Accordingly, the mobile robot moves in response to the transmitted remote control signal.

In regard to the transmission of the live-view moving picture data from the mobile robot to the controller of the remote control center, a transmission rate of the live-view moving picture data may suddenly change in at least one channel according to an ambient environment. The term 'an ambient environment' used herein refers to an ambient luminance, a subject to be captured by a camera, and a pattern of the subject to be captured.

In the case of a sudden rise in the transmission rate of the live-view moving picture data, due to limitations in transmission capacity, at least some of the live-view moving picture data may be lost during the transmission. Accordingly, the live-view moving picture data being displayed on the display device included in the remote control center may also become distorted. That is, problems that may prevent a user from smoothly controlling the mobile robot may arise.

Such problems in the related art are addressed by the inventors to derive the present inventive concept. Thus, these problems may not be simply referred to as information which was known to the general public before the application of the present inventive concept.

SUMMARY

One or more exemplary embodiments provide a robot control system that allows a user smoothly control a mobile robot by eliminating distortion of image such as live-view moving picture data being displayed on a display device included in a remote control center.

Various aspects of exemplary embodiments of the inventive concept will be set forth in part in the description which follows and, in part, will be apparent from the description, or may be learned by practice of the exemplary embodiments.

According to one or more exemplary embodiments, there is provided a robot control system which may include a mobile robot and a controller.

The controller may transmit, to the mobile robot, a signal for adjusting a resolution of a next image to be transmitted from the at least one camera to the controller, based on a data transmission rate of a current image captured by the at least one camera and output to the controller.

The mobile robot may adjust the resolution of the next image, based on the signal for adjusting the resolution of the next image.

The resolution of the next image may be adjusted to be inversely proportional to the data transmission rate of the current image. The at least one camera may include a plurality of cameras configured to capture a plurality of current images and output the captured current images to the controller through a plurality of channels, respectively, wherein each of the current images has an importance degree for each of the plurality of channels, and wherein the resolution of the next image is adjusted based on the importance degree for each of the channels. The resolution of the next image for each of the channels may be adjusted to be inversely proportional to the data transmission rate of the current image for each of the channels.

Thus, even in the case of a sudden rise in the data transmission rate of the current image, image data loss may be prevented during the transmission. Accordingly, distortion of an image being displayed on a display included in a remote control center may be also prevented. That is, a user may smoothly control the mobile robot.

BRIEF DESCRIPTION OF THE DRAWINGS

These and/or other aspects will become apparent and more readily appreciated from the following description of the exemplary embodiments, taken in conjunction with the drawings, in which:

FIG. 7 shows another example of an LUT used for performing step S303 of FIG. 3, according to an exemplary embodiment.

DETAILED DESCRIPTION OF THE EXEMPLARY EMBODIMENTS

Figure 1:
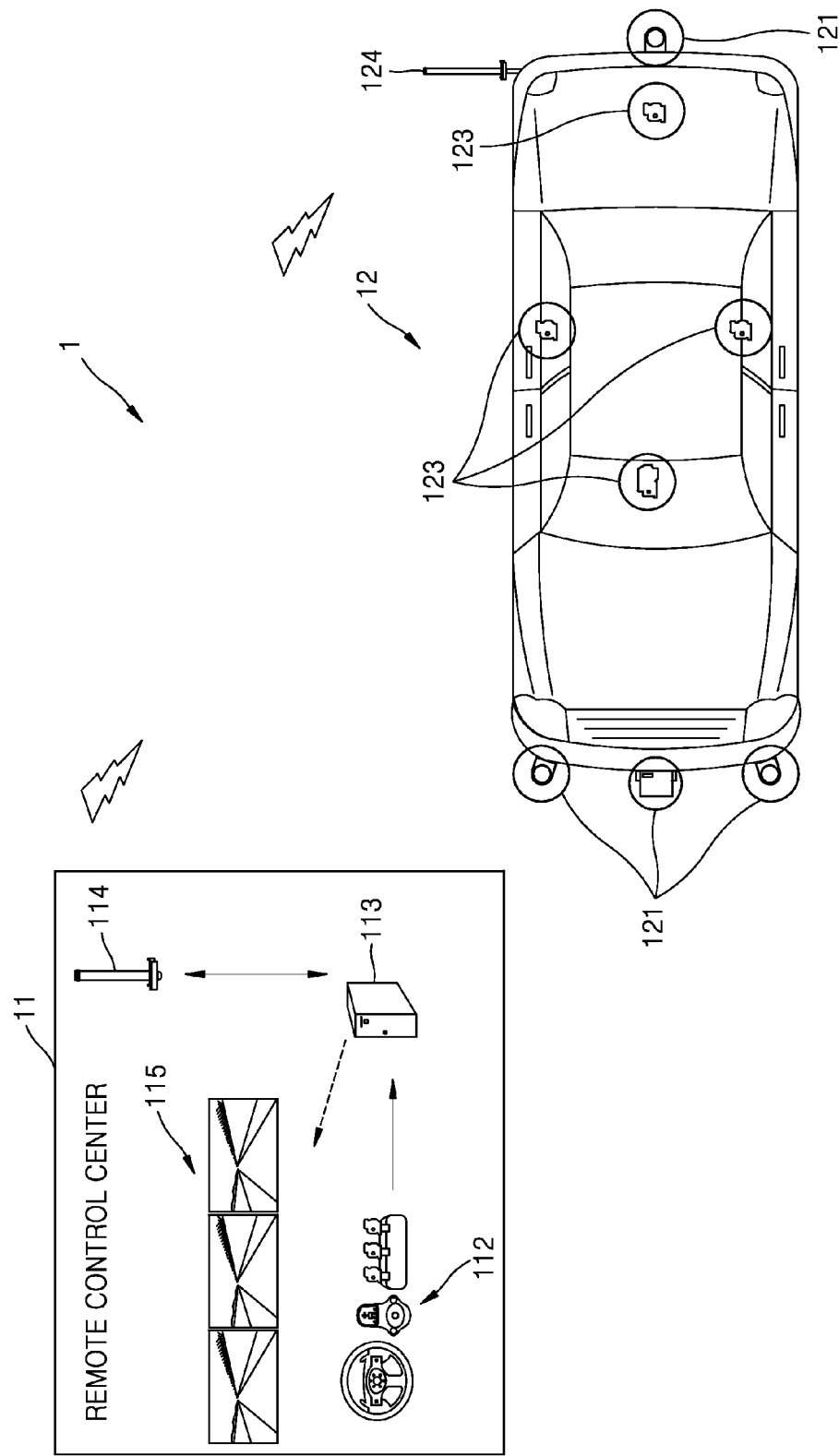
FIG. 1 is a diagram illustrating a robot control system, according to an exemplary embodiment.

Reference will now be made in detail to exemplary embodiments which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain various aspects of the inventive concept.

The descriptions and attached drawings for illustrating the exemplary embodiments are referred to in order to gain a sufficient understanding, the merits thereof, and the objectives accomplished by the implementation. In the description, certain detailed explanations of the related art are omitted when it is deemed that they may be obvious to those of ordinary skill in the art.

While the inventive concept has been particularly shown and described with reference to the exemplary embodiments thereof, it will be understood by those of ordinary skill in the art that various changes in form and details may be made therein without departing from the spirit and scope of the inventive concept as defined by the following claims.

Figure 2:
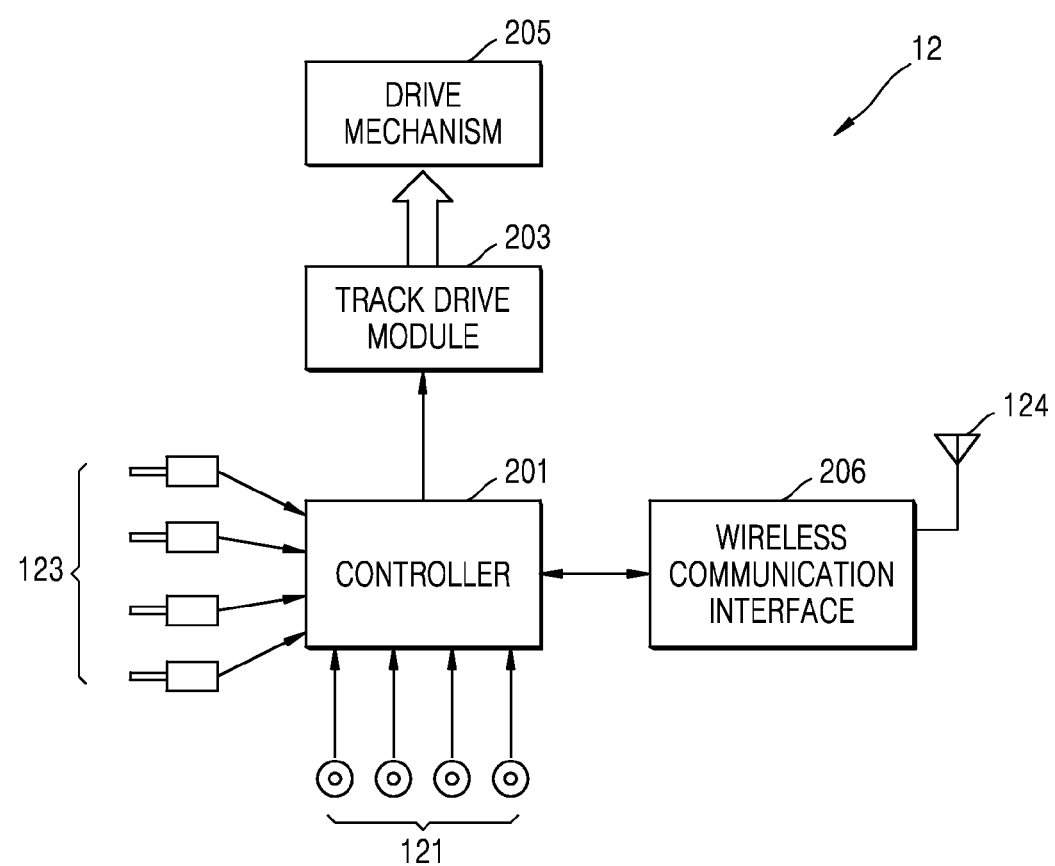
FIG. 2 is a diagram showing a main configuration of a mobile robot of FIG. 1, according to an exemplary embodiment.

FIG. 1 is a diagram illustrating a robot control system 1 according to an exemplary embodiment of the present inventive concept. FIG. 2 is a diagram showing a main configuration of a mobile robot 12 of FIG. 1.

Referring to FIGS. 1 and 2, the robot control system 1 includes a user input module 112, a controller 113, and a mobile robot 12 according to an exemplary embodiment.

The user input module 112 included in a remote control center 11 generates a drive signal according to a user input. The user input module 112 includes a steering module, an accelerator, a brake and a gear-shifting module. That is, the drive signal may be a signal for steering, accelerating, breaking and gear-shifting control.

The controller 113, e.g., a control computer, included in the remote control center 11 generates a remote control signal in response to the drive signal output from the user input module 112.

Then, the mobile robot 12 moves according to the remote control signal output from the controller 113.

In detail, cameras 123 for capturing images of surroundings of the mobile robot 12 are attached to the mobile robot 12, and a controller 201 of the mobile robot 12 transmits live-view moving picture data obtained from the cameras 123 to the controller 113 of the remote control center 11 through a wireless communication interface 206 and an antenna 124.

The controller 113 of the remote control center 11 processes signals of the live-view moving picture data output from the antenna 114 and displays the moving pictures representing the surroundings of the mobile robot 12 on a display 115 based on the processed signals. Accordingly, a user manipulates the user input module 112 while watching the moving pictures representing the surroundings of the mobile robot 12 being displayed on the display 115.

The controller 113 of the remote control center 11 generates a remote control signal in response to the drive signal output from the user input module 112. The generated remote control signal is transmitted wirelessly to the mobile robot 12 through an antenna 114 of the remote control center.

Then, the mobile robot 12 moves according to the received remote control signal. That is, the controller 201 of the mobile robot 12 is configured to control an operation of a track drive module 203 according to the remote control signal received from the antenna 124 and the wireless communication interface 206 of the mobile robot.

The track drive module 203 is configured to drive a track mechanism using, for example, a steering module, an accelerator, a brake and a gear-shifting module, according to the drive control signal output from the controller 201. That is, the track control signals output from the controller 201 and input to the track drive module 203 may include control signals for steering, accelerating, breaking and gear-shifting. Here, the steering module, the accelerator, the brake and the gear-shifting module of the track driver module 203 may correspond to the steering module, the accelerator, the brake and the gear-shifting module of the user input module 112 included in the remote control center 11 in their respective functions.

In an exemplary embodiment, a plurality of sensors 121 for detecting a position of an object are attached to the mobile robot 12, and the controller 201 of the mobile robot 12 creates a route along which the mobile robot 12 may drive in accordance with the information about the position of the object detected by the sensors 121, e.g., laser sensors. In addition, the controller 201 of the mobile robot creates a driving guidance map during a driving mode, in accordance with the information about the position of the object detected by the sensors 121. The term "a driving guidance map" used herein refers to a cost map such as "Grid-based Perception Cost map". The cost map is configured to set an object area first, and then, set a remaining area as an available driving area.

In the robot control system 1, the controller 113 of the remote control center 11 transmits signals for adjusting a resolution of an image, e.g., a live-view moving picture, to the mobile robots in accordance with a transmission rate of image data output from the mobile robot 12. Here, the image of which the resolution is adjusted may be an image to be transmitted from the mobile robot 12 to the remote control center 11 at a next time unit, and the image data of which the transmission rate is measured may be that of an image captured by the cameras 123 of the mobile robot 12 and transmitted to remote control center 11 at a current time unit. Also, the image of which the resolution is adjusted and transmission rate is measured may not be limited to a moving picture or moving image, and instead, may cover a still image.

The controller 201 of the mobile robot 12 adjusts, in accordance with the signals for adjusting the resolution of the image output from the controller 113, the resolution of the live-view moving picture data to be transmitted to the controller 113.

Here, the resolution of the live-view moving picture data to be transmitted to the controller 113 is set to be inversely proportional to a current transmission rate.

In addition, the live-view moving picture data is configured to have an importance degree for each of a plurality of channels included in the robot control system. For example, among video channels of the cameras 123 attached to the mobile robot 12, a front camera has the highest importance degree, a rear camera has the second highest importance degree, a leftward camera has the third highest importance degree, and a rightward camera has the fourth highest importance degree. Accordingly, the resolution of the live-view moving picture data is set according to the importance degree for each of the channels (see FIG. 7).

Figure 3:
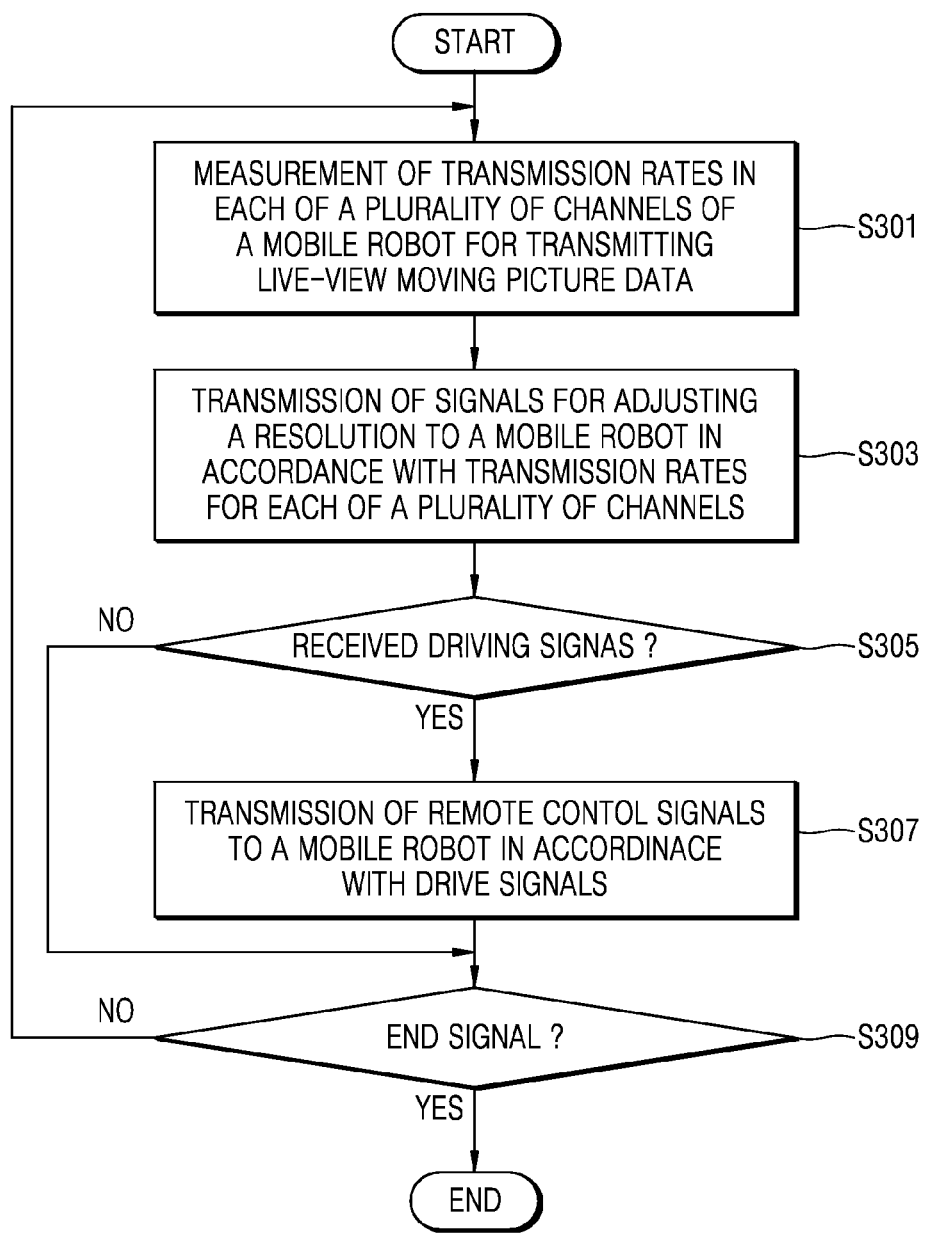
FIG. 3 is a flowchart for explaining operation steps of a controller included in a remote control center of FIG. 1, according to an exemplary embodiment.

FIG. 3 is a flowchart for explaining operation steps of the controller 113 of the remote control center 11 of FIG. 1. Referring to FIGS. 1 to 3, the operation steps of the controller 113 of the remote control center may be explained as follows. That is, the controller 113 of the remote control center outputs the live-view moving picture data on the display 115, the live-view moving picture data being output from the controller 201 of the mobile robot 12, to perform the following operation.

The controller 113 of the remote control center 11 is configured to measure a transmission rate of the live-view moving picture data output from the mobile robot 12 for each of the channels (step S301).

Next, the controller 113 of the remote control center 11 transmits, in accordance with the transmission rate measured for each of the channels, a signal for adjusting a resolution to the mobile robot 12 (step S303).

Meanwhile, the controller 113 of the remote control center 11 determines whether any drive signals have been output from the user input module 112 (step S305).

In the step S305, if drive signals have been output from the user input module 112, the controller 113 of the remote control center 11 transmits a remote control signal to the mobile robot 12 in response to the drive signals (step S307).

The steps S301 to S307 are repeatedly carried out until an end signal is generated (step S309).

Figure 4:
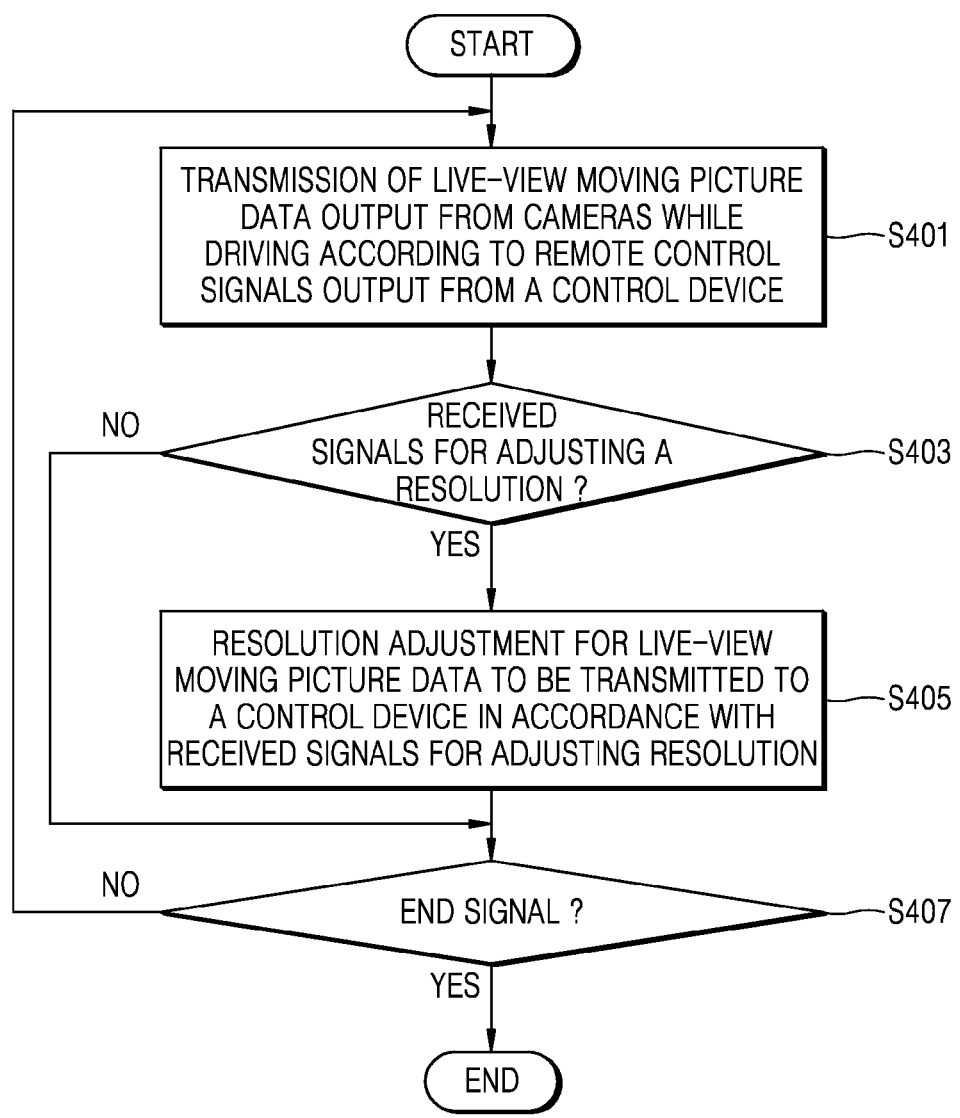
FIG. 4 is a flowchart for explaining operation steps of a controller included in a mobile robot of FIG. 2, according to an exemplary embodiment.

FIG. 4 is a flowchart for explaining operation steps of the controller 201 of the mobile robot 12. Referring to FIGS. 1, 2 and 4, the operation steps of the controller 201 of the mobile robot 12 may be explained as follows.

The controller 201 of the mobile robot 12 transmits the live-view moving picture data to the controller 113 of the remote control center 11, the live-view moving picture data being obtained by the cameras 123 that move according to the remote control signals output from the controller 113 of the remote control center 11 (step S401).

In addition, when the signal for resolution adjustment output from the controller 113 of the remote control center 11 is received (step S403), the controller 201 of the mobile robot 12 adjusts, in accordance with the received signal for resolution adjustment, a resolution of the live-view moving picture data to be transmitted to the controller 113 of the remote control center 11 (step S405).

The steps S401 to S405 are repeatedly carried out until an end signal is generated (step S407).

Referring to the operations illustrated in FIGS. 3 and 4, in regard to the transmission of the live-view moving picture data from the mobile robot 12 to the controller 113, the resolution of the moving picture data to be transmitted may be automatically adjusted according to the current transmission rate. For example, the resolution of moving picture data to be transmitted may be automatically adjusted inversely proportional to the current transmission rate.

In this regard, even in the case of a sudden rise in the transmission rate of the live-view moving picture data in accordance with the images being captured, omission of the data that may occur due to limitations in transmission capacity during the transmission may be prevented. Accordingly, distortion of the live-view moving picture data being displayed on the display 115 of the remote control center 11 may be also prevented. That is, a user may smoothly control the mobile robot 12.

Figures 5, 6:
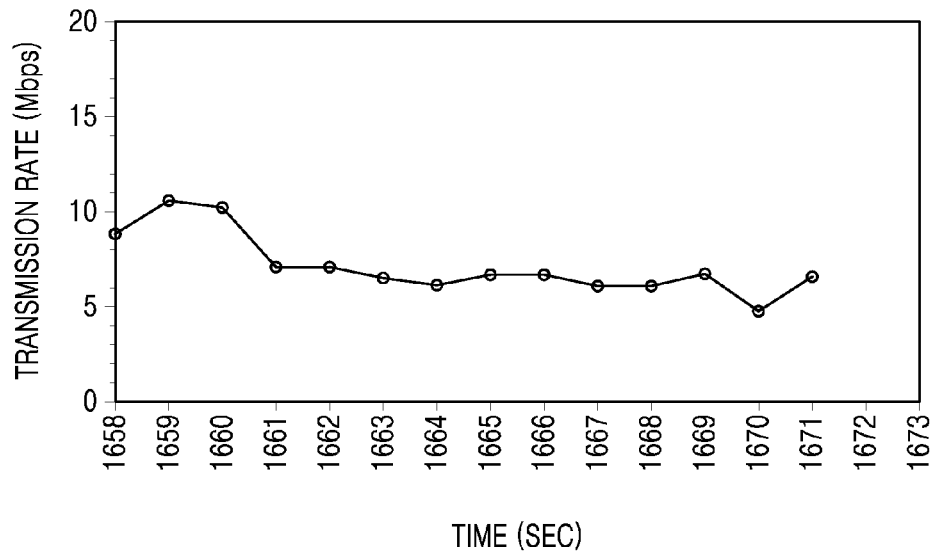
FIG. 5 is a graph showing a transmission rate which is associated with live-view moving picture data of one channel according to time and obtained by repetitively performing step S301 of FIG. 3, according to an exemplary embodiment.
FIG. 6 shows an example of a look-up table (LUT) used for performing step S303 of FIG. 3, according to an exemplary embodiment.

FIG. 5 is a graph showing a transmission rate which is associated with live-view moving picture data of one channel according to time and obtained by repetitively performing step S301 of FIG. 3.

Referring to FIGS. 1, 2 and 5, in regard to the transmission of the live-view moving picture data from the mobile robot 12 to the control device 113 of the remote control center 11, it is confirmed that the transmission rate associated with one channel may suddenly change in accordance to an ambient environment. Here, the term 'an ambient environment' used herein refers to an ambient luminance, a subject, and a pattern of the subject to be imaged. For example, the measured transmission rate shows sudden changes during a period of 1658 to 1661 seconds and a period of 1669 to 1671 seconds.

In the case of such a sudden rise in the transmission rate as measured during a period of 1658 to 1659 seconds, a problem in which data is lost may occur due to limitations in transmission capacity. Accordingly, the moving pictures in live-view displayed on the display 115 may become distorted. That is, problems that may prevent a user from smoothly controlling the mobile robot may arise.

FIG. 6 shows an example of a look-up table (LUT) used for performing step S303 in FIG. 3.

Referring to FIG. 6, the resolution of the live-view moving picture data to be transmitted is set to be inversely proportional to a current transmission rate.

In an exemplary embodiment of FIG. 6, the live-view moving picture data is not configured according to the importance degree for each of the channels. For example, among video channels of the cameras 123 attached to the mobile robot 12, the importance degrees of the front camera channel, the rear camera channel, the leftward camera channel and the rightward camera channel are the same as one another.

Accordingly, the live-view moving picture data for each of the channels is configured to have only one resolution based on the transmission rate of any one of the camera channels (Mbps: Mega-bits per second).

FIG. 7 shows another example of an LUT used for performing step S303 in FIG. 3.

Referring to FIG. 7, the resolution of the live-view moving picture data to be transmitted is set to be inversely proportional to a current transmission rate.

In an exemplary embodiment of FIG. 7, the live-view moving picture data is configured according to the importance degree for each of the channels. For example, among video channels of the cameras 123 attached to the mobile robot 12, the front camera channel (first channel) has the highest importance degree, the rear camera channel (second channel) has the second highest importance degree, the leftward camera channel (third channel) has the third highest importance degree, and the rightward camera channel (fourth channel) has the fourth highest importance degree.

Accordingly, the live-view moving picture data for each of the channels is configured to have a different resolution according to the different importance degree. That is, the resolution of the live-view moving picture data channel is set differently for each of the channels based on the transmission rate of any one of the camera channels (Mbps: Mega-bits per second).

In other words, the resolution of the live-view moving picture data for each of the channels is inversely proportional to the transmission rate of the live-view moving picture data for each of the channels, and is proportional to the importance degree for each of the channels.

As described above, the robot control system may automatically adjust the resolution of the live-view moving picture data when transmitting the data from the mobile robot to the control device, in accordance with the current transmission rates. For example, the resolution of the live-view moving picture data to be transmitted may be automatically adjusted inversely proportional to the current transmission rate.

Therefore, even in the case of a sudden rise in the transmission rates of the moving picture date according to images being captured, data loss that may occur due to limitations in transmission capacity during the transmission may be prevented. Accordingly, distortion of the live-view moving picture data being displayed on the display 115 of the remote control center 11 may be also prevented. That is, a user may smoothly control the mobile robot 12.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A robot control system comprising:
a mobile robot comprising at least one camera; and
a controller,
wherein the controller is configured to transmit, to the mobile robot, a signal for adjusting a resolution of a next image to be captured and transmitted by the at least one camera to the controller, based on a data transmission rate of at least one channel for the at least one camera at which a current image captured by the at least one camera is transmitted to the controller,
wherein the mobile robot is configured to adjust the resolution of the next image, based on the signal for adjusting the resolution of the next image,
wherein the at least one camera comprises a plurality of cameras configured to capture a plurality of current images and output the captured current images to the controller through a plurality of channels, respectively,
wherein each of the current images has an importance degree for each of the channels, and
wherein the resolution of the next image is adjusted based on the importance degree for each of the channels.

2. The robot control system of claim 1, wherein the resolution of the next image for each of the channels is adjusted to be inversely proportional to a data transmission rate of each of the channels.

3. The robot control system of claim 2, wherein the resolution of the next image for each of the channels is adjusted to be proportional to the importance degree.

4. A mobile device control system comprising:
a mobile device comprising at least one camera; and
a controller,
wherein the controller is configured to transmit, to the mobile device, a signal for adjusting a resolution of a next image to be captured and transmitted by the at least one camera to the controller, based on a data transmission rate of at least one channel for the at least one camera at which a current image captured by the at least one camera is transmitted to the controller,
wherein the mobile device is configured to adjust the resolution of the next image, based on the signal for adjusting the resolution of the next image,
wherein the at least one camera comprises a plurality of cameras configured to capture a plurality of current images and output the captured current images to the controller through a plurality of channels, respectively,
wherein each of the current images has an importance degree for each of the channels, and
wherein the resolution of the next image is adjusted based on the importance degree for each of the channels.

5. The mobile device control system of claim 4, wherein the resolution of the next image for each of the channels is adjusted to be inversely proportional to a data transmission rate of each of the channels.

6. The mobile device control system of claim 5, wherein the resolution of the next image for each of the channels is adjusted to be proportional to the importance degree.

7. A controlling apparatus comprising:
a communication interface configured to receive data of at least one image captured by at least one camera, respectively;
a controller configured to transmit, to the at least one camera, at least one signal for adjusting a resolution of a next image to be transmitted from each of the at least one camera to the controller, based on a data transmission rate of at least one channel for the at least one camera at which a current image captured by each of the at least one camera is transmitted to the controller,
wherein the at least one camera comprises a plurality of cameras configured to capture a plurality of current images and output the captured current images to the controller through a plurality of channels, respectively,
wherein each of the current images has an importance degree for each of the plurality of channels, and
wherein the resolution of the next image is adjusted based on the importance degree for each of the channels.

8. The controlling apparatus of claim 7, wherein the resolution of the next image for each of the channels is adjusted to be inversely proportional to a data transmission rate of each of the channels.

9. The controlling apparatus of claim 8, wherein the resolution of the next image for each of the channels is adjusted to be proportional to the importance degree.

* * * * *